Patented Aug. 18, 1925.

1,550,629

UNITED STATES PATENT OFFICE.

CHARLES L. PAULUS, OF DAYTON, OHIO.

METHOD OF BRAZING.

No Drawing.  Application filed June 6, 1924. Serial No. 718,399.

To all whom it may concern:

Be it known that I, CHARLES L. PAULUS, a citizen of the United States, residing at Dayton, in the county of Montgomery and State of Ohio, have invented certain new and useful Improvements in Methods of Brazing, of which the following is a specification.

This invention relates to the art of brazing and its object is to provide a method which may be used in dip brazing where it is not desired to have all of the surface of the part dipped coated with brazing compound.

By utilizing my new method, much time is saved which would otherwise be wasted in removing excess brass from portions of the brazed part. It is particularly applicable to cases where closely machined parts such as gear teeth are rigidly attached to a part which it is desired to dip braze. By my invention, the flux and brass are prevented from building up or in any way changing the dimension of the part brazed except where the brass is intended to be applied.

In the art of brazing, it is of course well known that when an iron or steel rod, for example, is dipped into the melted brass and flux, in a dip brazing process, the brass will be applied in a thin coating all over the surface of the dipped part. I have discovered that if portions of the dipped part are first coated with a rejecting coating consisting of a mixture of alkali silicate and graphite, the brass will not stick or be applied to the coated parts. When the mixture is applied to the surface, a layer of graphite and sodium silicate of extremely small thickness, probably in the neighborhood of a hundred-thousandth of an inch, is added which prevents the melted brass from ever reaching and being applied to the coated part due to the heat resisting qualities of the coating composition.

The mixture of sodium silicate and graphite which I have found most satisfactory, is formed by adding one part of flake graphite to four parts, by weight, of sodium silicate and mixing to approximately the consistency of ordinary thick paint. This mixture is applied to the parts which it is desired to preserve from the action of the dip brazing process. After application of the coating, it is allowed to dry or is artificially dried by the application of heat. After drying, the part or assembly of parts is dip brazed during which operation, only those uncoated parts of the piece have the coating of brass applied. After the brazing process, the coating of sodium silicate and graphite is very easily removed by abrasion or chemically or it may be left on the surface which it serves to protect to a considerable extent against the action of heat and moisture. The coating is so extremely thin, that no material change in dimension is made if the coating is left applied.

I am aware that the method which I have herein set forth may be applied to other brazing processes besides the dip brazing process which I have used as an example of my invention.

I claim:

1. A method of partially brazing a metallic part consisting in applying to portions thereof a rejecting coating of a mixture of an alkaline silicate and graphite, and subsequently dip brazing the part.

2. A method of partially brazing a metallic part consisting in applying to portions thereof, a rejecting coating of a mixture of an alkiline silicate and graphite, allowing the coating to dry and then dip brazing the part.

3. A herein described method of protecting portions of a part to be brazed consisting in painting said portions with a mixture of alkali silicate and graphite having the proportionate ratio of about four to one, and allowing the coating to dry before brazing the part.

In testimony whereof I affix my signature.

CHARLES L. PAULUS.